Sept. 6, 1949.  E. D. PAUL  2,481,442
ADJUSTABLE HAND RAKE
Filed Jan. 7, 1947  4 Sheets-Sheet 1

INVENTOR
Edgar D. Paul.
BY
ATTORNEYS

Sept. 6, 1949.  E. D. PAUL  2,481,442
ADJUSTABLE HAND RAKE
Filed Jan. 7, 1947  4 Sheets-Sheet 3
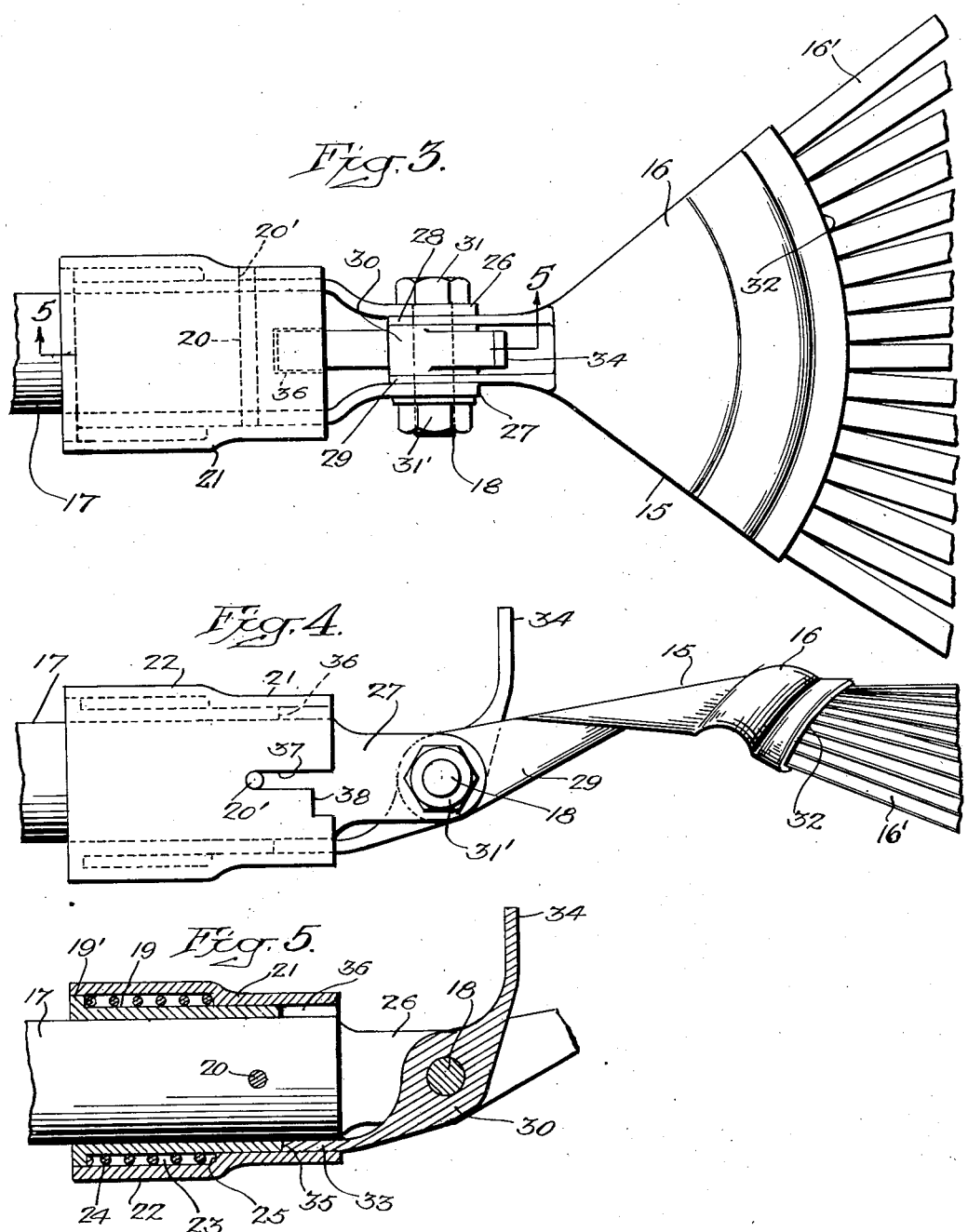

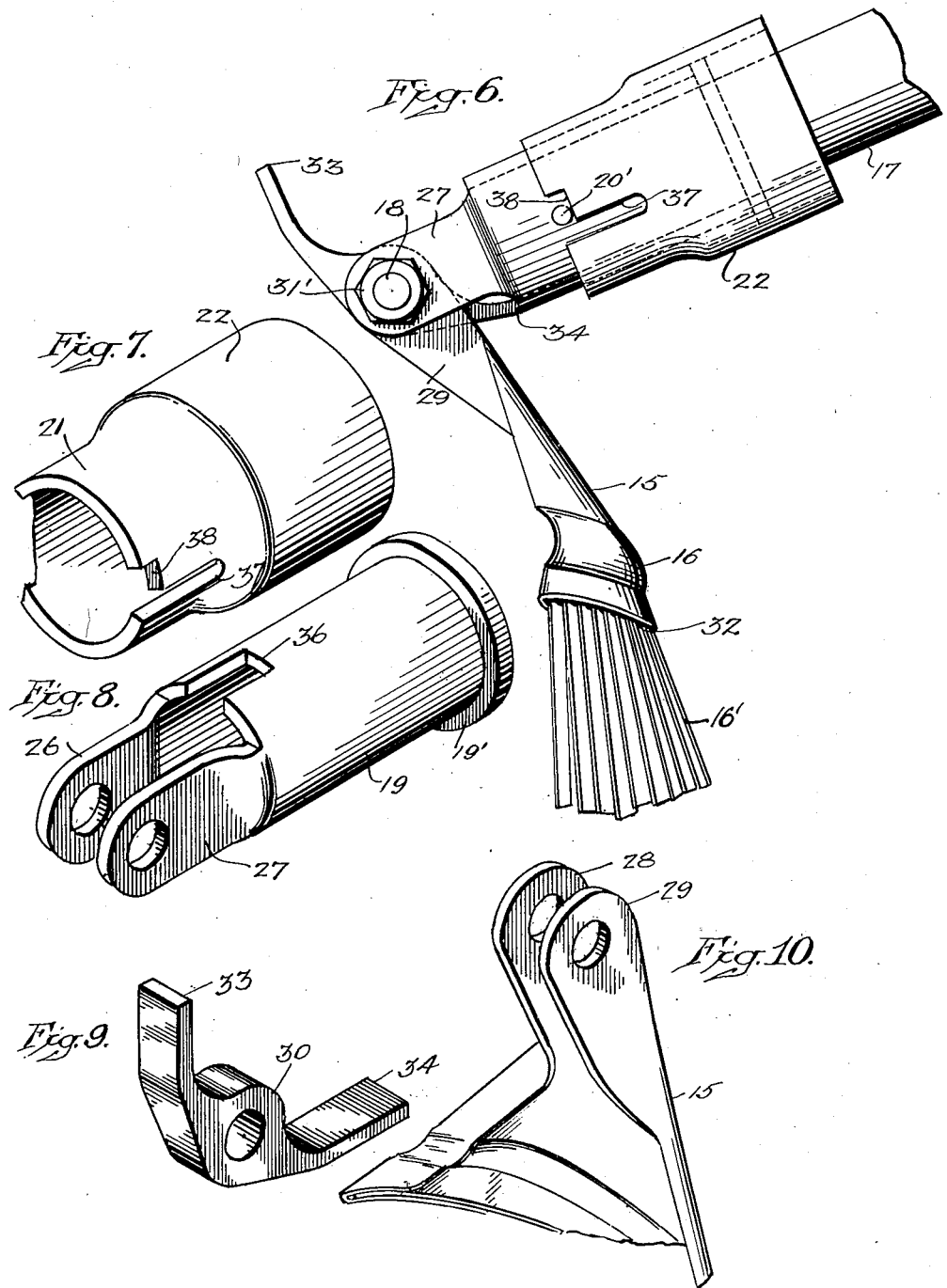

Patented Sept. 6, 1949

2,481,442

UNITED STATES PATENT OFFICE 2,481,442

ADJUSTABLE HAND RAKE

Edgar D. Paul, Wynnewood, Pa.

Application January 7, 1947, Serial No. 720,624

2 Claims. (Cl. 56—400.20)

My invention relates to adjustable hand rakes.

The main purpose of my invention is to provide an adjustable hand rake for use on lawns, etc.

A further purpose is to construct a hand rake which can be used as a pusher for removing leaves, etc., or as a puller for similar use.

A further purpose is to use an adjustable tined head upon a handle of a rake.

A further purpose is to construct a hand rake which can be set in a rigid position upon a handle for a pulling operation.

A further purpose is to construct a hand rake which can be set in a rigid position for use on a handle for a pushing operation.

A further purpose is to provide a spring-pressed cover for a connection between a head extension and an operating handle of a hand rake.

A further purpose is to provide a latch and slot connection between a tined head and an operating handle of a hand rake to securely hold the tined head in either a pushing or pulling position.

A further purpose is to provide a spring pressed sleeve upon a handle to make interfitting and adjustable connection between a head and a rake handle.

Further purposes will appear in the specification and in the claims.

Describing in illustration, but not in limitation, and referring to the drawings:

Figure 1 is a perspective view of my improved adjustable rake in which the head is shown in position for pulling the rake to gather up leaves or grass upon a lawn or the like.

Figure 2 is a perspective view showing my hand rake in use on a lawn with the head in a pushing position.

Figure 3 is a fragmentary top plan view of my improved adjustable rake, set in a position for the pulling operation.

Figure 4 is a fragmentary side elevation of the rake shown in Figure 3.

Figure 5 is a fragmentary vertical section taken on the line 5—5 of Figure 3.

Figure 6 is a side elevation similar to Figure 4, but showing the tined head in a pushing position with respect to the handle.

Figure 7 is a fragmentary perspective view of a detail of the outer sleeve used in my invention.

Figure 8 is a perspective view of the inner sleeve used in my invention.

Figure 9 is a perspective view of a latch used in carrying out my invention.

Figure 10 is a fragmentary perspective view of the tined head, showing eared connectors by which the head is fastened to the inner sleeve.

Figure 1:

My invention is intended to overcome disadvantages found in present lawn rakes.

I have found it desirable to have a lawn rake which can be used in either a handle pulling operation upon the leaves on other debris upon a lawn or the like and in a pushing position of the rake handle. Accordingly I have developed a rake which answers each of these requirements.

In raking leaves, grass or the like upon a lawn it sometimes becomes desirable to use the rake in a pushing position, similar to the way that a broom is sometimes used in a sweeping operation. My improved rake will answer the pushing requirements when it is set in the adjusted position for that use. It will also answer the ordinary requirements of pulling as in the present day rakes.

In Figure 1, I have shown my rake in use upon a lawn. It shows clearly the rake being pulled by the user.

In Figure 2, the rake head has been adjusted with respect to the handle to present it for use as a pusher, similar to the movement used when a person is sweeping, as with a broom.

In developing my improved rake, I found it desirable for lawn use, especially in raking leaves, grass or the like, to use flexible tines of the spreading variety. These tines are secured in a head structure and in the present invention the head structure is pivotally connected to extensions from the operating handle.

My improved rake 15 comprises a tine-supporting head 16, with a handle 17 and a pivoted joint 18. Upon the handle 17 I secure a ferrule 19. The ferrule 19 is secured to the handle by means of a pin 20. About the ferrule 19 I mount a sleeve 21 which has its outer end enlarged in diameter at 22 to present a space 23 between the sleeve 22 and the ferrule 19. Into this space 23 and about the ferrule 19 I place a compression spring 24, which abuts a shoulder 19' at the outer end of the sleeve and which has its opposite end abut a shoulder 25 at the opposite end of the space within the enlarged part of the sleeve 22. The forward end of the ferrule 19 carries ears 26 and 27, which are fitted about the pivot 18 and spaced from one another to allow for the insertion of ears 28 and 29 approaching from the head 16.

The ears 28 and 29 are spaced from one another upon the shaft 18 to permit the insertion of a latch 30, which fills the entire lateral space between the ears 28 and 29 and to which it is permanently fastened by welding or the like. The pivot 18 has at one end a bolt head 31 and at the other end a nut 31', which is secured on to the pivot 18. This will securely hold the parts together at the pivot point and at the same time will permit swinging movement of the head 16 with respect to the handle 17, or with the handle 17 with respect to the head 16.

The head 16 is preferably constructed of pressed metal, which is bent over at the tine receiving end in order that the tines can be placed within the metal and after they are properly positioned may spread in a fanlike formation to present the tine ends in such a position that they will cover considerable space due to the spread obtained by the fanlike formation. The tines are then fastened in place by pressing the metal folds at 32 about the tines.

The latch member 30 can be moved about the pivot 18. The latch carries a finger extension 33 at the bottom and 34 at the top. The latch finger 33 is adapted to be placed in a slot 35 in the ferrule 19 to securely hold the head portion in a comparatively straight line in order that the rake may be used for a pulling operation, as shown in Figure 1.

If it should be desired to change the position of the rake head with respect to the handle 17 as clearly shown in Figure 2, the sleeve 21 is pushed rearwardly against the spring 24 to allow the finger 33 of the latch 30 to become disengaged from the slot 35, and after this action has taken place the opposite or upper finger 34 can be swung into the slot 36 diametrically opposite from the sot 35. At the same time the rake head 16 carrying the ears 28 and 29 is swung into a rearward position as clearly shown in Figure 6 to present the tines in a position of use like that shown in Figure 2 where the rake is adapted to be pushed instead of pulled as in Figure 1.

The invention is primarily applicable to hand garden rakes of the type having resilient or spring tines 16' which in the pulling position have a portion 16² in general prolongation of a handle and a portion 16³ at an angle with the handle and generally transverse to the ground. Rakes of this character are in some respects similar to brooms and perform a broom-like function in raking. If the rake of Figure 1 is pulled toward the user the portion 16² acts like a basket to collect leaves or other material raked, and if an obstruction is encountered the resilient tines yield away from the direction of movement without any pronounced tendency to dig in. If, however, the rake as shown in Figure 1 were pushed against the ground, no basket-like or leaf collecting function would be exerted by the portions 16² of the tines, and on encountering an obstruction the tines would tend to dig in. By moving the angle of the head as shown in Figure 2 so that the basket-like or broom-like portion 16² of the tines faces the direction of motion, and the end portions 16³ are again suitably transverse to the ground, material raked is collected by the rake in pushing action, and on encountering an obstruction the resilient tines again yield away from the direction of motion without tendency to dig in.

As an aid to making the change from the pushing to the pulling position or the reverse while the latch fingers are being changed and the head is being changed, the pin extension 20', which is fastened to the handle 17 and ferrule 19, is drawn out of the slot 37 and allowed to rest on the step 38 in the forward end of the sleeve 22. This will aid in holding the parts while the latch is being changed, as shown in Figure 6.

I have found that a rigid device is obtainable by the use of the construction above described.

If it is desired to change the position from a pulling position, as used in the ordinary rake, to a pushing position, similar to the pushing action of a broom when it is in use, the sleeve 21 is moved rearwardly against the action of the spring 24 far enough to allow the latch finger 33 to become detached from the slot 35. While in this position the sleeve is turned to cause the shoulder 38 to become engaged to the pin extension 20', to temporarily hold the spring in compressed position and to make the slots 35 and 36 free for the insertion of the finger 34, when the latch member is swung about the pivot 18. The head is then placed in a position similar to Figure 6 and the sleeve 21 is allowed to move over the latch finger 34.

As the latch 30 is permanently fastened to ears of the head 16, it will be clearly seen that the head will be held in a rigid position with respect to the handle, thereby holding all of the joined parts together to make a rigid construction.

I believe I am the first to provide a hand rake which is capable of either pushing or pulling use.

It is desirable in carrying out my invention to use a fairly long handle because of the reversal of the rake head from a pulling to a pushing position or vice versa.

My rake is preferably made of pressed metal, die castings or forgings, although it may in some instances be made all or in part of plastic material. It will be noted that in the illustrations of Figure 1 and Figure 2 my rake clearly shows its adaptability of use in either a pulling position or a pushing position.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. A hand rake having a handle, a head, an adjustable pivotal connection having fixed adjustment positions between one end of the handle and the head and conventional resilient broom type rake tines on the head diverging therefrom, whereby the angular relation of the tines to the handle can be changed to a position in which the rake can be used as a pusher rake.

2. A hand rake having a handle, a head secured crosswise to one end of the handle, and conventional resilient broom type rake tines secured to the head with the tines diverging from the head and having on the tines, portions near the ends remote from the head which are bent in a direction away from the end of the handle remote from the head, whereby the rake is adapted to be used as a push type rake.

EDGAR D. PAUL.

REFERENCES CITED

The following references are of record in the file of this patent:

UNITED STATES PATENTS

| Number | Name | Date |
| --- | --- | --- |
| 885,309 | Adams | Apr. 21, 1905 |
| 951,024 | Parker | Mar. 1, 1910 |
| 966,602 | Ross | Aug. 9, 1910 |